United States Patent
Schirmer et al.

(10) Patent No.: US 10,823,494 B2
(45) Date of Patent: Nov. 3, 2020

(54) REFRIGERATING AND/OR FREEZING DEVICE

(71) Applicant: LIEBHERR-HAUSGERÄTE OCHSENHAUSEN GMBH, Ochsenhausen (DE)

(72) Inventors: Marc Schirmer, Biberach-Ringschnait (DE); Manuel Bentele, Steinhausen (DE)

(73) Assignee: Liebherr-Hausgeräte Ochsenhausen GmbH, Ochsenhausen (DE)

( * ) Notice: Subject to any disclaimer, the term of this patent is extended or adjusted under 35 U.S.C. 154(b) by 0 days.

(21) Appl. No.: 16/464,707

(22) PCT Filed: Nov. 30, 2017

(86) PCT No.: PCT/EP2017/080940
§ 371 (c)(1),
(2) Date: May 29, 2019

(87) PCT Pub. No.: WO2018/100043
PCT Pub. Date: Jun. 7, 2018

(65) Prior Publication Data
US 2019/0323764 A1    Oct. 24, 2019

(30) Foreign Application Priority Data

Nov. 30, 2016 (DE) .................. 10 2016 014 284
Feb. 27, 2017 (DE) .................. 10 2017 002 302

(51) Int. Cl.
*F25D 27/00* (2006.01)
*F21V 33/00* (2006.01)
(Continued)

(52) U.S. Cl.
CPC .......... *F25D 27/00* (2013.01); *F21V 33/0044* (2013.01); *G02B 6/0001* (2013.01);
(Continued)

(58) Field of Classification Search
CPC .... F25D 27/00; F21V 33/0044; G02B 6/0001
(Continued)

(56) References Cited

U.S. PATENT DOCUMENTS 3,278,738 A * 10/1966 Clark ................... G02B 6/4298
362/552
4,068,931 A * 1/1978 Weaks ....................... F21V 9/08
359/892
(Continued)

FOREIGN PATENT DOCUMENTS

CN     1186212 A    7/1998
CN     2881491 Y    3/2007
(Continued)

OTHER PUBLICATIONS

German Patent Application No. 10 2017 002 302.6, Search Report [German], dated Oct. 27, 2017.
(Continued)

*Primary Examiner* — Bryon T Gyllstrom
(74) *Attorney, Agent, or Firm* — Marshall, Gerstein & Borun LLP

(57) ABSTRACT

The present invention relates to a refrigerating and/or freezing device having a cooled interior chamber which comprises a recessed interior chamber portion, wherein the device has a lighting means and a light guide situated between the lighting means and a wall surface of the interior chamber portion, wherein the lighting means and the light guide are arranged in such a way that the light guide emits the light introduced by the lighting means into the interior chamber portion.

10 Claims, 5 Drawing Sheets

Figure 1:
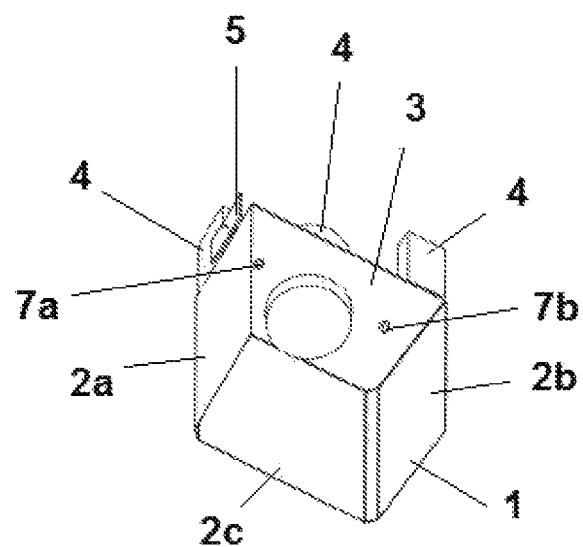

(51) Int. Cl.
*F21V 8/00* (2006.01)
*F21Y 115/30* (2016.01)
*F21Y 115/10* (2016.01)
*F21Y 115/15* (2016.01)
*F21W 131/305* (2006.01)

(52) U.S. Cl.
CPC .... *F21W 2131/305* (2013.01); *F21Y 2115/10* (2016.08); *F21Y 2115/15* (2016.08); *F21Y 2115/30* (2016.08)

(58) Field of Classification Search
USPC .......................................................... 362/92
See application file for complete search history.

(56) References Cited

U.S. PATENT DOCUMENTS

| | | | | |
|---|---|---|---|---|
| 5,701,235 | A * | 12/1997 | Hagemeyer Cook | .................. F25D 29/005 362/23.15 |
| 2003/0137828 | A1 * | 7/2003 | Ter-Hovhannisian | ...................... A47F 3/001 362/92 |
| 2004/0264160 | A1 * | 12/2004 | Bienick | .................. A47B 97/00 362/602 |
| 2005/0036300 | A1 * | 2/2005 | Dowling | ............ A47G 19/2227 362/101 |
| 2007/0247831 | A1 * | 10/2007 | Buelow, II | .............. A47F 3/001 362/92 |
| 2009/0272136 | A1 * | 11/2009 | Knoll | ...................... A47F 3/001 62/251 |
| 2010/0175404 | A1 * | 7/2010 | Kim | ........................ F25D 23/04 62/264 |
| 2014/0320040 | A1 * | 10/2014 | Katu | ...................... F25D 27/00 315/292 |

FOREIGN PATENT DOCUMENTS

| | | |
|---|---|---|
| CN | 1959313 A | 5/2007 |
| DE | 4404247 A1 | 8/1995 |
| DE | 202011000856 U1 | 8/2011 |
| DE | 10201000386 A1 | 10/2011 |
| DE | 102010003826 A1 | 10/2011 |
| GB | 2248676 A | 4/1992 |
| JP | H0510984 U | 2/1993 |
| JP | H050459 A | 3/1993 |
| JP | H0560459 A | 3/1993 |
| JP | H0798176 A | 4/1995 |
| JP | 2000258051 A | 9/2000 |
| KR | 100727025 B1 | 6/2007 |
| KR | 20120072781 A | 7/2012 |
| WO | WO-2009/132954 A2 | 11/2009 |
| WO | WO-2013/126961 A1 | 9/2013 |

OTHER PUBLICATIONS

International Application No. PCT/EP2017/080940, International Search Report and Written Opinion [German], dated May 4, 2018.

* cited by examiner

REFRIGERATING AND/OR FREEZING DEVICE

The invention relates to a refrigerator unit and/or freezer unit comprising a cooled inner compartment that comprises a niche-like inner compartment section.

The illumination of niche-like inner compartment sections has previously been achieved using illuminants directly attached thereto, for example using LEDs arranged at the upper cover. The illumination and the light distribution were by the position and the directional characteristic of the illuminants in this solution. The positions of the illuminants, for example of the LED board, that are ideal for installation reasons, on the one hand, and for illumination reasons, on the other hand, frequently do not coincide. A compromise has to be found.

It is the object of the invention to achieve an optimum and uniform illumination of the niche-like inner compartment section and simultaneously to achieve a positioning of the illuminant that is favorable for installation reasons.

This object is achieved in accordance with the invention by a refrigerator unit and/or freezer unit having a cooled inner compartment that comprises a niche-like inner compartment section, wherein the unit has an illuminant and a light guide arranged between the illuminant and a wall surface of the inner compartment section and wherein the illuminant and the light guide are arranged such that the light guide emits the light introduced by the illuminant into the inner compartment section.

The light guide can therefore conduct the light, starting from the illuminant, to a different point that is more favorable for the illumination of the niche-like inner compartment section. It can be achieved in this manner that the comparatively larger illuminant can be attached to a position that is favorable for installation reasons, while the comparatively smaller light guide can lead to that point that is most favorable for an illumination at which, however, little space may possibly be available and that is possibly difficult to access, for example for servicing or for cabling.

Provision is made in an embodiment that the unit has at least two light guides that are connected to the illuminant and that are arranged such that they emit light introduced by the illuminant at different points into the inner compartment section. With a plurality of light guides, the introduction is possible at a plurality of points to achieve an even more uniform illumination.

Provision is made in an embodiment that an optical element that influences the light emission characteristic is present at the end of the light guides at the inner compartment side. Examples include lenses and the like.

Provision is made in an embodiment that the illuminant has one or more individual light sources, with the light sources preferably comprising LEDs, OLEDs, or lasers. These light sources can, for example, be arranged on one board or distributed over a plurality of boards. The illuminant in the sense of the claim is therefore to be understood as the sum of the individual light sources associated with the light guides. Each of the individual light sources or groups of individual light sources can be associated with different light guides. The light sources can also be arranged at points remote from one another.

Provision is made in an embodiment that the light sources are configured and arranged such that they introduce light of different intensities into the different light guides.

Provision is made in an embodiment that the light guides have different designs and are preferably of different lengths. It is thus conceivable that at least two of the light guides differ in length, in thickness and/or in guiding characteristics. It can therefore be achieved in operation of the unit that the light intensities emanating from the individual light guides are the same despite the different designs of the light guides. A corresponding operating behavior is likewise covered by the present idea of the invention.

The cross-section of the light guides can be round or square. Other cross-sections are also conceivable. The use of flexible light guides is also conceivable to achieve higher flexibility in the installation. A mirror coating of the jacket surfaces can also be provided to increase efficiency of the light guides.

Provision is made in an embodiment that the illuminant is arranged at a boundary wall of the inner compartment section, for example at the outer side of the boundary wall, with the boundary wall being able to be a section of the inner container.

Provision is made in an embodiment that the illuminant is arranged asymmetrically with respect to the boundary surface of the inner compartment section corresponding to the boundary wall. If the boundary wall is, for example, formed by a flat section of the inner container, the illuminant would not lie at the center of the section in this embodiment, but rather in its marginal region, for example. If no light guide were present, the inner compartment section would not be uniformly illuminated in this embodiment since the light irradiation would come from a corner region of the boundary surfaces.

Provision is made in an embodiment that the illuminant is arranged, and preferably, foamed in, outside the inner compartment.

Provision is made in an embodiment that the inner compartment section is a tray such as a drawer, a niche formed by a molding of the inner container, or a storage compartment at least partially separate from the remaining inner compartment.

Provision is made in an embodiment that the unit is a domestic refrigerator having preferably one refrigerant circuit, preferably a combination refrigerator and freezer unit. The respective inner compartment section can be formed by a section of the cooling part or of the freezing part, for example by a drawer arranged in the cooling part or in the freezing part.

Figure 2:
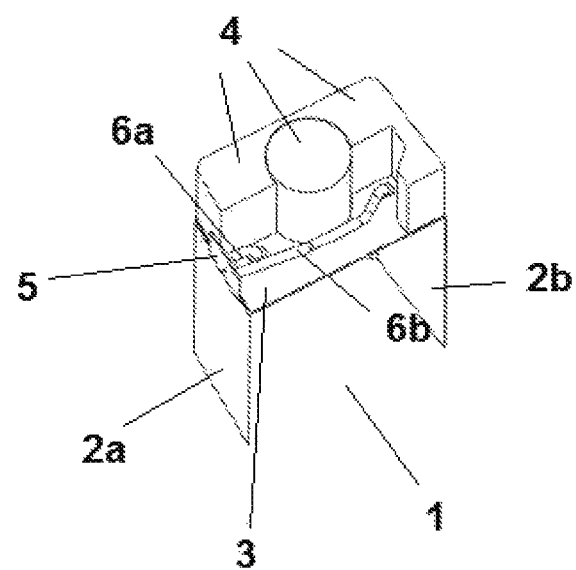
Figure 3:
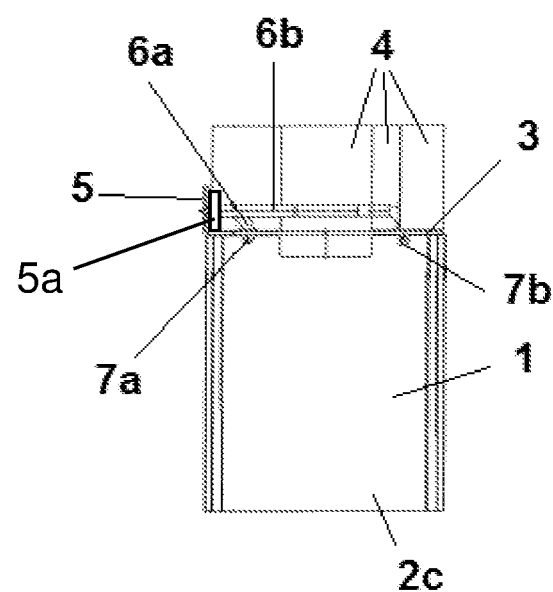
Figure 4:
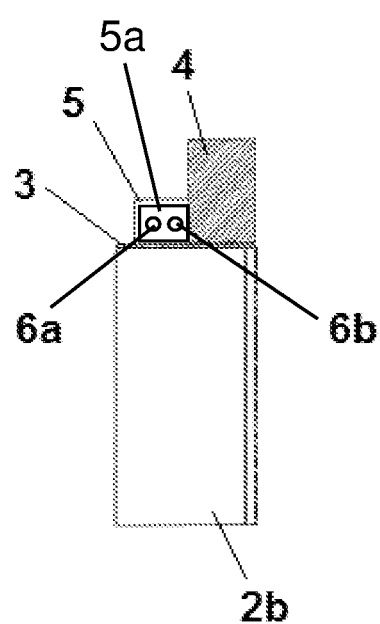

Further details and advantages of the invention result from the following embodiment described with reference to the Figures. There are shown in the Figures:

FIG. 1: a perspective view of bounding walls of a niche in the inner compartment of a unit in accordance with the invention obliquely from below;

FIG. 2: a perspective view of the same wall parts obliquely from above;

FIG. 3: a front view of the same wall parts;

FIG. 4: a side view of the same wall parts; and

Figure 5:
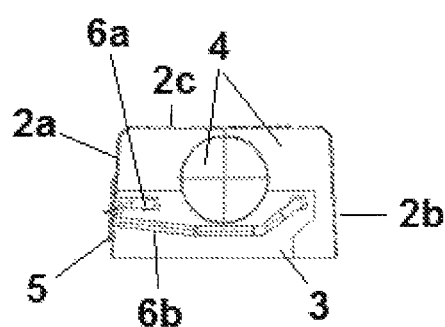

FIG. 5: a plan view of the same wall parts.

A niche-like compartment section of a refrigerator unit and/or freezer unit in accordance with the invention is shown in the Figures. The niche is generally marked by reference numeral 1. It is bounded by three side walls 2a, 2b, and 2c and by a top 3. The side walls 2a, 2b, and 2c can, for example, be parts of the inner container. The top 3 can be represented, for example, by an intermediate tray within the unit. It is conceivable that the niche 1 is configured to receive a drawer not shown in the Figure or a different dispensing unit. It is also conceivable that the niche 1 has a base that is not shown in the Figure and that can likewise be represented by an intermediate tray within the unit.

This niche 1 should be illuminated or staged as much as possible in operation of the unit. For this purpose, the niche can be illuminated from outside or starting from a wall of the niche 1, with the latter being preferred for a complete and uniform illumination. It is necessary here to arrange an illuminant that illuminates the niche at one of the side walls 2a, 2b, and 2c or at the top 3. It can be advantageous here in the interest of a uniform illumination to arrange the illuminant at the top 3, in particular when, for example, a drawer or another dispensing unit is arranged in the niche 1 that could impede an incidence of light from the side or from below.

However, some components 4 that influence the space conditions at the top are arranged in the unit at the outside of the top 3 of the niche 1. Elements requiring space of a niche illumination such as LED boards and a corresponding cabling cannot be arranged freely at any desired point at the outside of the top 3 due to these components whose corresponding placement results from the design of the refrigerator unit. This applies accordingly to potential moldings of the top 3 that are not everywhere possible.

Provision is now made in the unit in accordance with the invention not to attach the illuminant 5 for the illumination of the niche 1 directly at the point of the top 3 at which the light should be emitted into the niche 1, but rather at a different point at which an installation and a cabling is most favorable in view of the space conditions limited by the components 4. An arrangement in an isolated region is conceivable that is sensible from a technical safety and production aspect. Starting from the illuminant 5, the light is then conducted with the help of two light guides 6a and 6b to specific points of the top 3, starting from where a light introduction into the niche 1 is particularly favorable. Using this principle, regions that are difficult to access can also be illuminated despite the tight space conditions for the light guide. A symmetrical light distribution can be produced in the niche 1 by the implementation of this invention despite an asymmetrical arrangement of the illuminants 5 caused by the construction space. The asymmetrical positions of the illuminant 5 with respect to the illumination environment, i.e. the niche 1, are distributed symmetrically in the illumination environment due to the geometry of the light guides 6a and 6b.

The illuminant 5 is a board in the present example having a plurality of LEDs arranged thereat as individual light sources. Different LEDs of the illuminant 5 are associated with the different light guides 6a and 6b to achieve a different irradiation characteristic, for example to be able to irradiate light of different intensities into the two light guides 6a and 6b. To this extent, the light sources that couple into the respective light guides 6a and 6b are electronically scaled or weighted such that the emanating light intensities at the end of the light guides 6a and 6b are the same despite different geometries and in particular lengths.

An optical system 7a or 7b respectively at the end of the light guides 6a and 6b generally generates a symmetrical light distribution despite fundamentally different directional characteristics at the light outlet of the light guides 6a and 6b that can be caused by different geometries and lengths of the light guides and by the different light emanation positions in the niche 1.

The invention claimed is:

1. A refrigerator unit and/or a freezer unit comprising a cooled inner space that comprises a niche-like inner compartment section, wherein the unit has an illuminant and at least two light guides arranged between the illuminant and a wall surface of the inner compartment section, wherein the light guides are connected to the illuminant and are arranged such that the light guides emit light introduced by the illuminant at different points into the inner compartment section;
   wherein the illuminant has two or more individual light sources;
   the light sources are configured and arranged such that the light sources introduce light of different intensity into the different light guides by a corresponding operating behavior,
   wherein the illuminant is arranged outside the inner compartment, and
   wherein the illuminant is foamed in outside the inner compartment.

2. The refrigerator unit and/or freezer unit in accordance with claim 1, wherein the light guides are of different designs.

3. The refrigerator unit and/or freezer unit in accordance with claim 2, wherein the light guides are of different lengths.

4. The refrigerator unit and/or freezer unit in accordance with claim 1, wherein the illuminant is arranged at a boundary wall of the inner compartment section with the boundary wall being able to be a section of the inner container.

5. The refrigerator unit and/or freezer unit in accordance with claim 4, wherein the illuminant is arranged asymmetrically with respect to the boundary surface of the inner compartment section corresponding to the boundary wall.

6. The refrigerator unit and/or a freezer unit in accordance with claim 1, wherein the inner compartment section is a tray such as a drawer, a niche formed by a molding of the inner container, or a storage tray at least partially separate from the remaining inner compartment.

7. The refrigerator unit and/or freezer unit in accordance with claim 1, wherein the unit is a domestic refrigerator.

8. The refrigerator unit and/or freezer unit in accordance with claim 7, wherein the unit is a domestic refrigerator having one refrigerant circuit.

9. The refrigerator unit and/or freezer unit in accordance with claim 7, wherein the unit is a combination refrigerator and freezer unit.

10. The refrigerator unit and/or freezer unit in accordance with claim 1, wherein the light sources comprise LEDs, OLEDs, or lasers.

* * * * *